United States Patent [19]
Sullivan et al.

[11] Patent Number: 6,069,647
[45] Date of Patent: May 30, 2000

[54] CONDITIONAL ACCESS AND CONTENT SECURITY METHOD

[75] Inventors: Robert R. Sullivan, Pleasanton; John M. Acken, Palo Alto, both of Calif.; David W. Aucsmith, Portland, Oreg.

[73] Assignee: Intel Corporation, Santa Clara, Calif.

[21] Appl. No.: 09/015,409

[22] Filed: Jan. 29, 1998

[51] Int. Cl.$^7$ .................................................. H04N 7/167
[52] U.S. Cl. ................................................. 348/5.5; 380/4
[58] Field of Search ................................ 348/5.5, 10, 12, 348/7, 13; 380/21, 42, 43, 46, 4, 49, 5, 23, 25, 57, 58; H04N 7/167

[56] References Cited

U.S. PATENT DOCUMENTS

| | | | |
|---|---|---|---|
| 4,800,590 | 1/1989 | Vaughan | 380/25 |
| 5,367,572 | 11/1994 | Weiss | 340/23 |
| 5,592,553 | 1/1997 | Guskie et al. | 380/23 |
| 5,802,176 | 9/1998 | Audebert | 380/23 |
| 5,892,899 | 4/1999 | Aucsmith et al. | 395/186 |

*Primary Examiner*—Chris Grant
*Attorney, Agent, or Firm*—Blakely, Sokoloff, Taylor & Zafman LLP

[57] ABSTRACT

A system featuring an interface unit connected to a programmable unit is described. The interface unit is capable of containing a time-sensitive key. The programmable unit is allowed to receive digital content from the interface unit upon establishing that the time-sensitive key is also contained therein.

14 Claims, 13 Drawing Sheets

6,069,647

CONDITIONAL ACCESS AND CONTENT SECURITY METHOD

BACKGROUND OF THE INVENTION

1. Field

The present invention relates to the field of content security. More particularly, this invention relates to a system and method for providing conditional access to incoming digital content.

2. Background Description

For many years, there has been a growing demand for electronic systems providing visual and/or audible content to consumers. Typically, content providers have supplied consumers with content in a variety of forms (e.g., movies, television programming, etc.). When transmitted in an analog format such as the National Television Systems Committee (NTSC) or Phase Alternating Line (PAL), formats, the content is somewhat protected due to the inherent nature of analog signaling. For example, analog content is troublesome to illicitly copy and redistribute. Also, the recorded copies have poorer image quality than the original content. On occasion, copy protection signals may be added to the content in order to inhibit its successful recordation by a video cassette recorder.

Over the last decade, there has been a growing demand for digital content. In set-top boxes, such as Digital Satellite System (DSS™) boxes by Sony Corporation of Tokyo, Japan, content is received in a digital format and is converted into an analog format prior to display or playback. This analog content possesses the same inherent protective nature as described above. Prior to conversion to an analog format, the digital content may be encrypted.

Recently, original equipment manufacturers (OEMs) are providing open, re-programmable digital platforms as part of the electronic system. For example, set-top computers (e.g., WEB TV™) are currently being sold in the market to receive content, such as Internet Protocol (IP) commands, download image(s), audio and the like. Unfortunately, these digital platforms render both hardware and software, including security applications, observable and modifiable by an unauthorized user or a malicious program. This threat has greatly impeded the expansion of digital content distribution because there is no adequate mechanism to protect content providers from unauthorized copying and distribution of their digital content.

In an attempt to mitigate unauthorized copying of digital content, certain electronic systems now are implemented with a receiver having a removable smart card that controls the flow of content. A "smart card" is a form factor similar to a credit card, but includes an integrated circuit (IC) instead of a magnetic strip. The IC provides one or more parameters used for identification and possibly for decryption of digital content provided from a remote transmission source. As a result, smart cards provide a conditional access mechanism to mitigate illicit access to digital content due to their replaceable nature.

To protect the digital content, it may be appropriate to redistribute replacement smart cards to subscribers of the electronic system if one of two conditions occurs; namely, (i) a predetermined time period has elapsed; or (ii) the global cryptographic key used by every electronic system has been uncovered. However, this redistribution of smart cards poses a number of disadvantages. For example, one disadvantage is that continued supply of replacement smart cards is costly to both content providers and subscribers. Another disadvantage is that this technique is subject to increased distribution costs as the number of attempts to circumvent electronic systems increase and as the number of subscribers increases each year. Yet another disadvantage is that many subscribers may experience a loss of services upon failing to receive replacement smart cards in a timely manner.

Therefore, it would be desirable to create an electronic system operating in accordance with conditional access without the disadvantages described above.

SUMMARY OF THE INVENTION

In one embodiment, a system comprises an interface unit coupled to a programmable unit. The interface unit is capable of containing a time-sensitive key. The programmable unit receives digital content from the interface unit upon establishing that the time-sensitive key is also contained therein.

BRIEF DESCRIPTION OF THE DRAWINGS

The features and advantages of the present invention will become apparent from the following detailed description of the present invention in which.

DESCRIPTION

Figure 1:
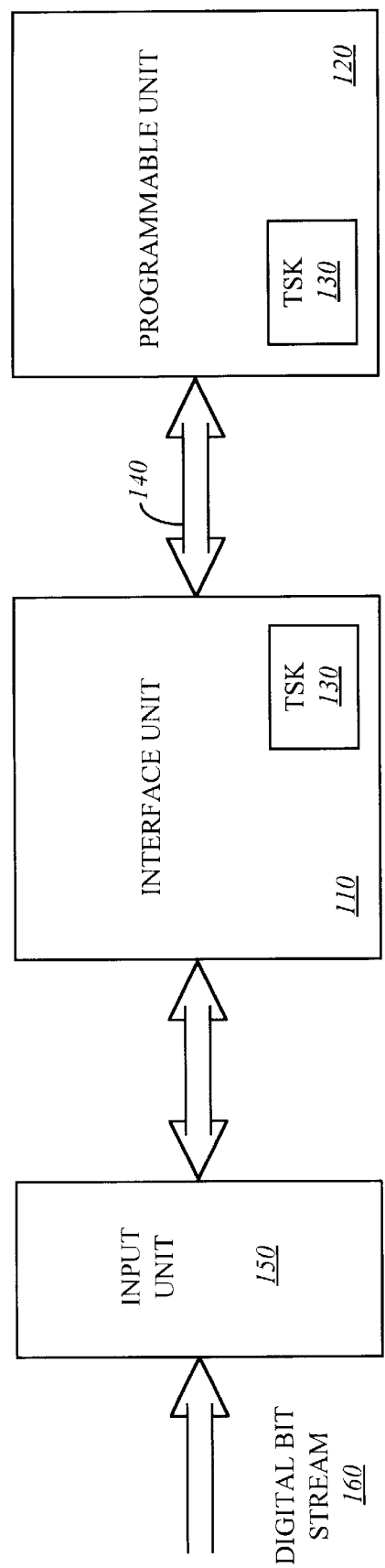
FIG. 1 is an illustrative block diagram of a first embodiment of an electronic system utilizing the present invention.

Embodiments of the present invention relate to an electronic system and method for preventing an open, re-programmable digital platform from accessing content, possibly received from a content provider, until one or more predetermined conditions have been satisfied. Upon satisfying these conditions, the digital platform is secure. It should be apparent that certain details are set forth in order to provide a thorough understanding of the present invention; however, to a person of ordinary skill in the art, the present invention may be practiced through many embodiments other that those illustrated. Also, well-known circuitry is not set forth in detail in order to avoid unnecessarily obscuring the present invention.

In the following description, some terminology is used to describe certain characteristics of the present invention as well as cryptographic functionality. For example, "content" is generally defined as (i) data signal (e.g., video and/or audio) and/or (ii) control signal information (e.g., an Internet Protocol "IP" command, an identifier, etc.). A "communication link" is defined as one or more information-carrying mediums (e.g., electrical wire, fiber optics, cable, bus trace, etc.) or wireless communications through established or later developed techniques such as infrared (IR) and radio frequency (RF) signaling.

With respect to cryptographic functionality, a "key" is signa; information used by a cryptographic function for encoding and/or decoding. A "cryptographic function" is a mathematical function used for encryption and decryption. Examples of cryptographic functions include (i) a symmetric key cryptographic function such as Data Encryption Standard (DES) and (ii) an asymmetric (public key) cryptographic function such as Rivest, Shamir and Adleman (RSA). The term "secure" indicates a state where it is virtually computationally infeasible for an unauthorized individual to access information in a non-encrypted format, and/or no authorized attempt to tamper with software (and perhaps hardware) has been detected.

In addition, a "digital certificate" is generally defined as any information used for authentication. Normally, this information is a public key encrypted with a private key (PRKCA) of a "certification authority," namely is any person or entity in a position of trust to guarantee or sponsor the digital certificate (e.g., a bank, governmental entity, trade association, original equipment manufacturer and the like). A "digital signature" is defined as a transformation, under an public-key cryptographic function, by encrypting data with a private key of the signatory. The digital signature is used to authenticate or verify the integrity of the data i.e., as such to ensure that the data has not been illicitly modified after being digitally signed. The data may be provided in its entirety, or as a hash value produced by a one-way hash function. A "one-way hash function" is a function, mathematical or otherwise, that takes content of a variable-length and converts it into a fixed-length. The term "one-way" indicates that there does not readily exist an inverse function to convert the fixed-length result back to the variable-length content.

First Embodiment of the Electronic System

Referring to FIG. 1, a first illustrative embodiment of an electronic system 100 is shown. In this embodiment, electronic system 100 includes an interface unit 110 and a programmable unit 120, both of which are periodically loaded with a time-sensitive key (TSK) 130. This periodicity in updating TSK 130 is a design choice and may range, for example, from a monthly or daily key updates to more frequent key updates such as every fraction of a second. Of course, the selected periodicity may vary over time or may be uniform in the alternative.

In one embodiment, TSK 130 may be featured as a signal value used for encryption and/or decryption. In another embodiment, TSK 130 may be implemented as a renewable series of instructions. These instructions may be an executable program forming a displayable object such as a periodically loaded electronic program guide.

The series of instructions may provide both decoding and/or encoding information to provide the functionality of a key as well as revocation information. The "revocation information" may include one or more digital certificates that are used to identify, via comparison with preloaded digital certificates (see FIG. 4), certain programmable units precluded from further using TSK 130 for various reasons (e.g., payment delinquency, misappropriation of that digital certificate, etc.). This revocation information may be placed in a selected location in TSK 130 (e.g., in the most significant bits, least significant bits, etc.). However, to hinder its removal during transmission, revocation information may be combined with the decoding and/or encoding information through bitwise alteration, through an Exclusive-Or (XOR) operation, or through placement in error correction code.

In general, TSK 130 ensures that content in a digital format (referred to as "digital content"), received by interface unit 110, is sent to programmable unit 120 when programmable unit 120 is secure. This may be accomplished by performing a number of pre-transfer operations before transmitting the digital content to programmable unit 120. Examples of these operations include, but are not limited or restricted to (i) checking whether an authentication program preloaded in programmable unit 120 has been modified without authorization; (ii) verifying that a communication link 140 between interface unit 110 and programmable unit 120 is secure; and (iii) authenticating the programmable unit 120. A more detailed description of these operations is presented below.

As further shown, an input unit (e.g., antenna or modem) 150 receives an incoming digital bit stream 160 from a transmission source (not shown) such as an orbiting satellite, a cable company, a network, a television broadcast company and the like. The input unit 150 may be constructed separate from interface unit 110 (as shown) or possibly implemented within interface unit 110. Normally, digital bit stream 160 features a number of communication channels, each channel usually transmitting different digital content. The digital content is placed in a predetermined data packet structure and possibly encrypted under either a symmetric key cryptographic function, or perhaps, a public-key cryptographic function.

Interface unit 110 and programmable unit 120 are shown as separate hardware equipment interconnected by communication link 140. Communication link 140 may support either parallel transmissions or serial transmissions over a Universal Serial Bus (USB), a high performance serial bus and the like. It is contemplated, however, that both interface unit 110 and programmable unit 120 may be incorporated as portions of a single peripheral such as a stand-alone digital versatile disc (DVD) player for example.

Figure 2:
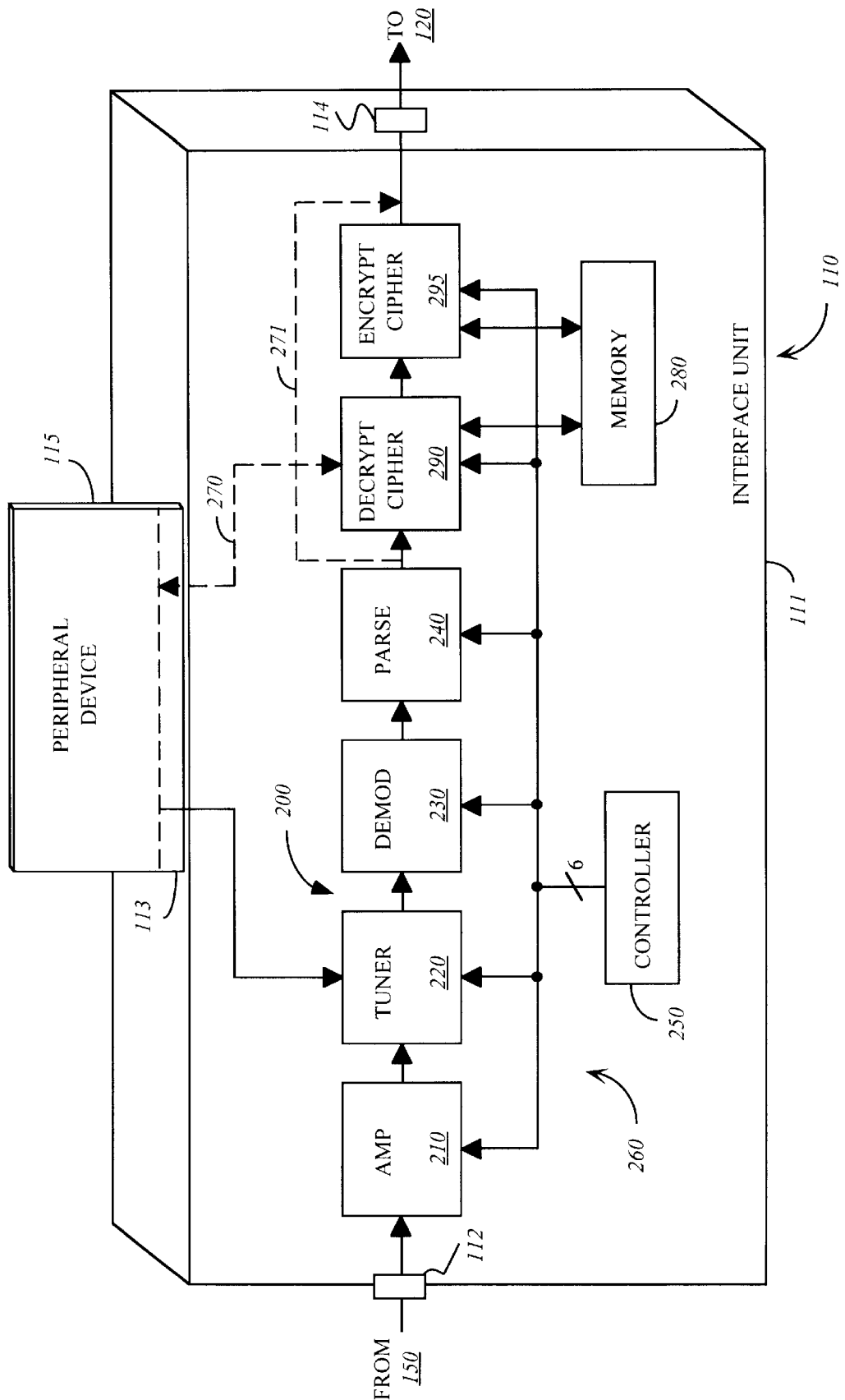
FIG. 2 is a diagram of an illustrative embodiment of the interface unit of the electronic system of FIG. 1.

Referring now to FIG. 2, one embodiment of interface unit 110 in accordance with FIG. 1 is illustrated. As shown, interface unit 110 is implemented as a broadband receiver capable of receiving and performing operations on a digital bit stream in order to select the transmission channel having a desired digital content. This broadband receiver 110 includes a casing 111 which is made of a hardened material (e.g., plastic or a metal alloy). Casing 111 is designed to include one or more input/output (I/O) ports.

For example, a first I/O port 112 allows an incoming digital bit stream, including digital content and possibly a time-sensitive key (TSK), to be routed from input unit 150 to internal circuitry of interface unit 110. A second I/O port 113 allows information to be loaded into or downloaded from a removable peripheral 115, such as a smart card. For example, removable peripheral 115 may provide an identifier, typically a uniquely assigned signal number, in order to indicate what digital content of incoming digital bit stream 160 is accessible by interface unit 110. Alternatively, removable peripheral 115 may provide a shared signal value used for generating a key needed to decrypt the digital content or for providing the key itself. A third I/O port 114 provides encrypted output signals to programmable unit 120.

The internal circuitry of interface unit 110 includes front-end circuitry 200 and a first controller 250. As shown, front-end circuitry 200 includes, but is not limited or restricted to, amplification circuitry (AMD) 210, tuner 220, demodulator (DEMOD) 230 and parse circuitry 240. The amplification circuitry 210 is used to amplify any relatively weak signals received at input unit 150. The tuner 220 allows a subscriber to "tune" to a desired frequency channel authorized by removable peripheral 115 while demodulator 230 decrypts the digital bit stream to uncover the digital content associated with the desired frequency. These circuits are controlled via communication link 260 by first controller 250 which may be a microprocessor, a microcontroller or a state machine.

Also controlled by first controller 250, parse circuitry 240 receives the decrypted digital content from demodulator 230 and separates the decrypted digital content based on different characteristics (video, audio, control, etc.). This allows TSK to be extracted from the digital content and stored in interface unit 110. TSK may be stored in an encrypted or non-encrypted format, in tamper resistant software loaded in internal memory 280, or perhaps in removable peripheral unit 115 as optionally shown by dashed lines 270. Moreover, the digital content (e.g., video and/or audio) may be decrypted and re-encrypted with a key recognized by programmable unit 120. Such decryption and encryption may be performed by software executed by first controller 250 or cipher hardware units 290 and 295 (as shown). Alternatively, the digital content may be passed through interface unit 110 in its encrypted format as optionally represented by dashed lines 271.

Figure 3:
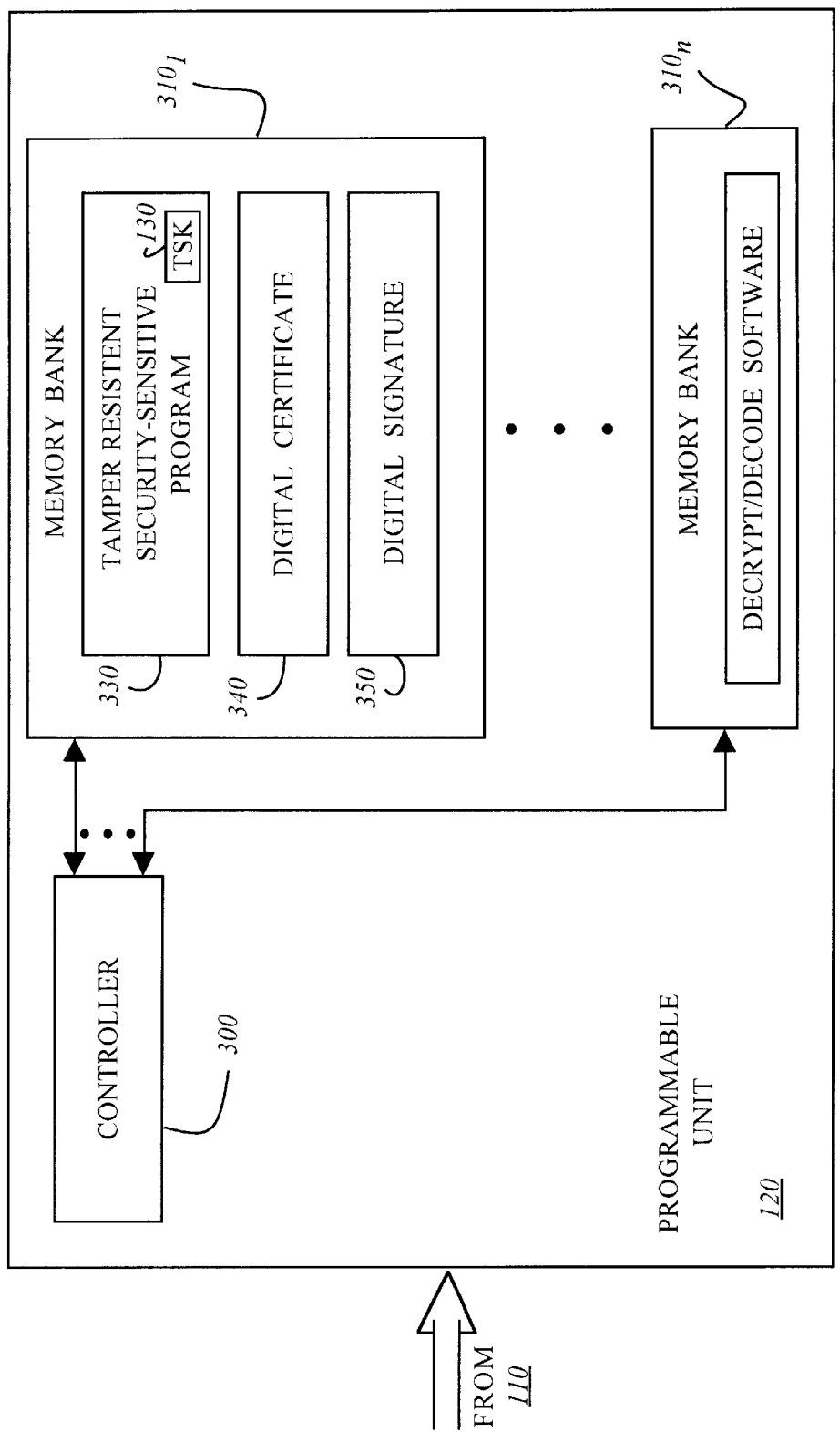
FIG. 3 is a diagram of an illustrative embodiment of the programmable unit of the electronic system of FIG. 1.

Referring now to FIG. 3, one embodiment of programmable unit 120 is illustrated. Programmable unit 120 is an open, re-programmable digital platform such as a computer (e.g., personal computer, set-top computer, laptop, hand-held, server, etc.) or any output unit having display, record or playback functionality (e.g., digital television, a digital video cassette recorder, or a digital versatile disk "DVD" player). In general, programmable unit 120 includes a second controller 300 and one or more memory banks $310_1$–$310_n$ ("n" is a positive whole number).

In this embodiment, these memory bank(s) $310_1$–$310_n$ are non-volatile (NV) memories capable of containing security-related executable programs, TSK 130, a preloaded digital certificate 340 and a digital signature 350. The "security-related executable programs" may include (i) an executable authentication program 330 to authenticate programmable unit 120 and/or interface unit 110 of FIG. 1 before the digital content is loaded, and (ii) an executable decryption/decode player program which transforms digital content into an acceptable format for viewing (e.g., a Motion Pictures Expert Group "MPEG" standard such as MPEG2) or for listening. As shown, authentication program 330 is tamper resistant and combined with TSK 130 as described in FIG. 4. Digital certificate 340 is used to identify programmable unit 120 and typically includes at least a public key (PUKPU) assigned to programmable unit 120 and encrypted with the private key (PRKCA) of a certification authority such as an original equipment manufacturer (OEM). Digital signature 350 is used for checking against software threats and normally includes a hash value of the authentication program encrypted with a private key of programmable unit 120.

Tamper Resistant Software

Figure 4:
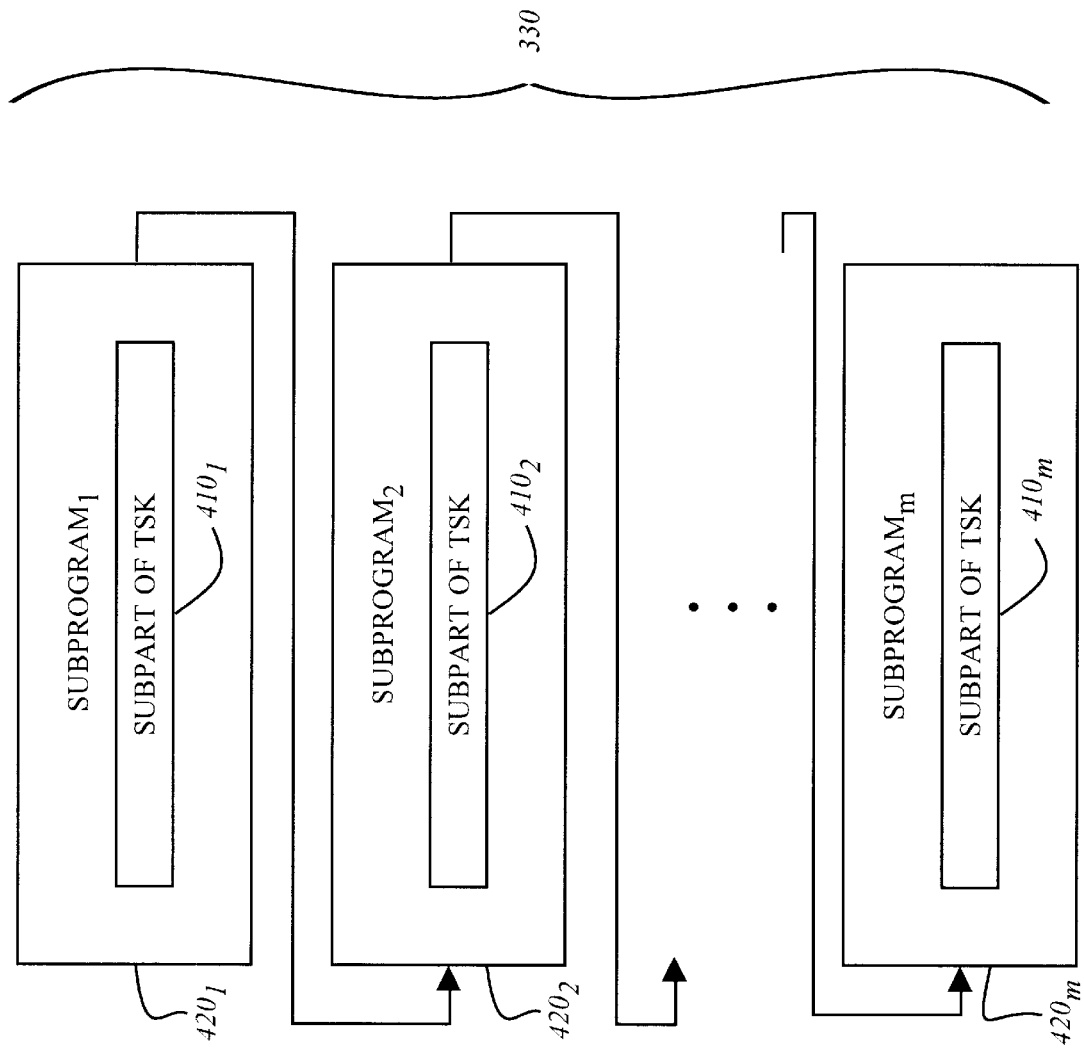
FIG. 4 is a diagram of an illustrative embodiment of a technique utilized by tamper resistant software loaded at least in the programmable unit of FIG. 1 to protect sensitive information.

Referring now to FIG. 4, a block diagram illustrating a technique to ensure that TSK 130 of FIG. 3 and a security-related executable program (e.g., authentication program) 330 are tamper resistant. Tamper resistance is accomplished through distribution in space as well as in time. For example, the TSK is partitioned into subparts $410_1$–$410_m$ ("m" is a positive whole number) and authentication program 330 is partitioned into a number of subprograms $420_1$–$420_m$ that operate with subparts $410_1$–$410_m$; for this illustrated embodiment, one subpart $410_1$–$410_m$ is assigned to each corresponding subprogram $420_1$–$420_m$, respectively. Subprograms $420_1$–$420_m$ are then executed over a period of time. As a result, the complete TSK cannot be observed or modified in any single point in space nor in any single point in time.

It is contemplated that these subprograms $420_1$–$420_m$ may be further interleaved with unrelated tasks in order to further obscure the true nature of the tasks being performed by subprograms $420_1$–$420_m$.

Figure 5:
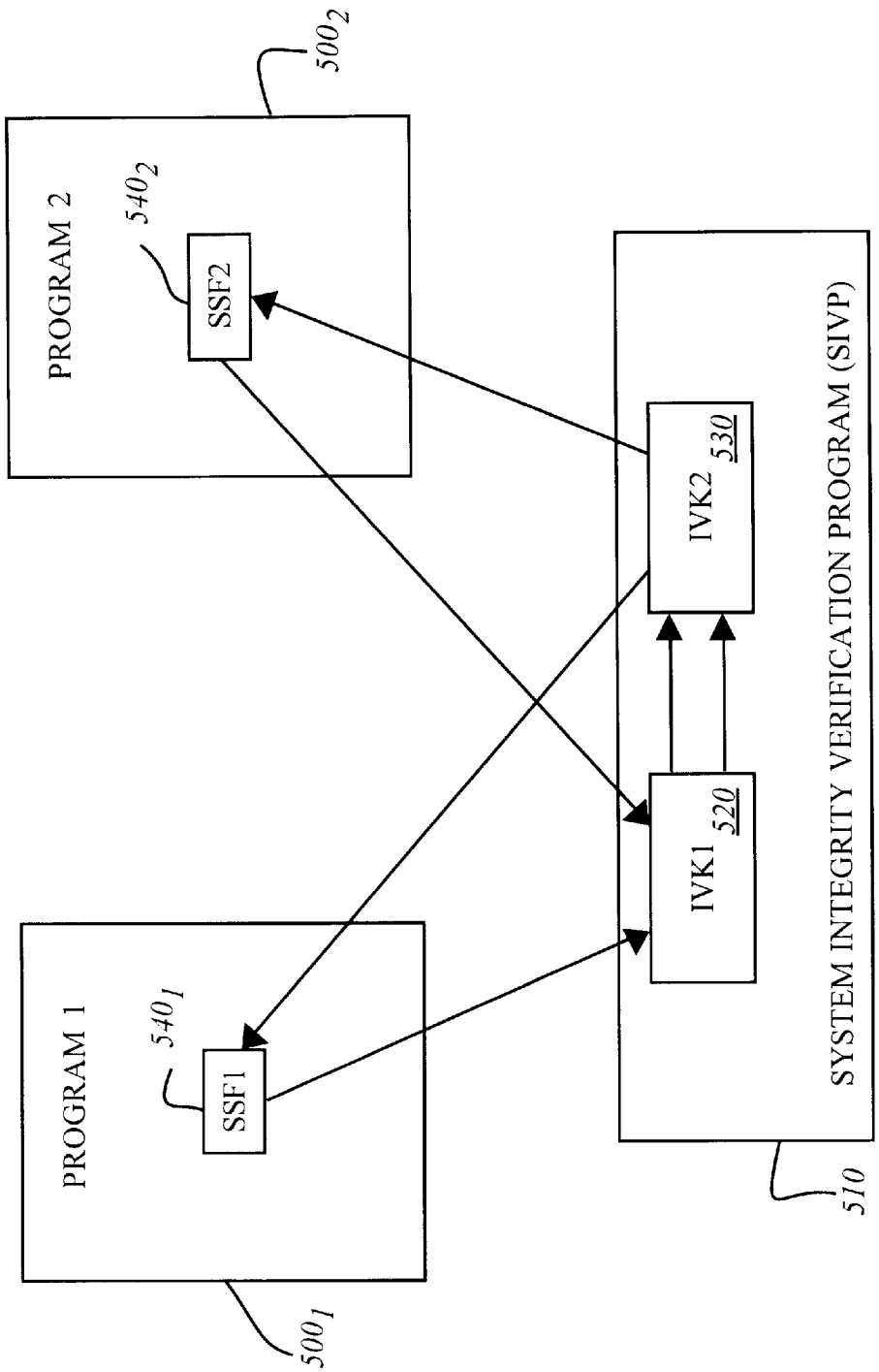
FIG. 5 is a diagram of an illustrative embodiment of another technique utilized by tamper resistant software to increase the difficulty in ascertaining the contents of sensitive information loaded in the tamper resistant software.

FIG. 5 illustrates an optional aspect of the tamper resistant software loaded in programmable unit 120 of FIG. 1. In accordance with this aspect, the electronic system may be made tamper resistant by making its security-related executable programs (e.g., authentication program $500_1$ and decryption/decode player program $500_2$) tamper resistant as described above. Furthermore, security of the electronic system may be further strengthened by providing a system integrity verification program (SIVP) 510 having a number of integrity verification kernels (IVKs), namely a first IVK (IVK1) 520 and a second IVK (IVK2) 530 in this embodiment.

IVK1 520 has a published external interface for other tamper resistant security sensitive functions (SSFs) $540_1$ and $540_2$ of the security-related executable programs $500_1$ and $500_2$ to call. Both IVKs are made tamper resistant in accordance with the partitioning and perhaps obfuscation aspects of the present invention described earlier. Together, the (i) tamper resistant SSFs $540_1$ and $540_2$ and (ii) IVKs 520 and 530 provide an interlocking trust mechanism.

In accordance with the interlocking trust mechanism, for the illustrated embodiment, tamper resistant SSF1 $540_1$ and SSF$_2$ $540_2$ are responsible for the integrity of security-related executable programs $500_1$ and $500_2$, respectively. IVK1 520 and IVK2 530 are responsible for the integrity of SIVP 510. Upon verifying the integrity of security-related executable programs $500_1$ or $500_2$, SSF1 $540_1$ or SSF2 $540_2$ will call IVK1 520. In response, IVK1 520 will verify the integrity of SIVP 510. Upon successfully doing so, IVK1 520 calls IVK2 530, which in response, will also verify the integrity of SIVP 510. The "integrity" of these applications and programs may be checked through standard cryptographic measures (e.g., a zero-knowledge protocol as described below) in which the executable programs is hashed and compared with a prior hash value of that program.

Thus, in order to tamper with security-related executable programs will result in tampering with SSF1 540₁, IVK1 520 and IVK2 530 at the same time. However, because IVK1 520 and IVK2 530 are also used by SSF2 540₂ and any other SSFs on the system, it would be necessary to tamper with all other SSFs at the same time to circumvent the interlocking trust mechanism.

Embodiments of Time-Sensitive Key Loading Procedures

Figure 6A:
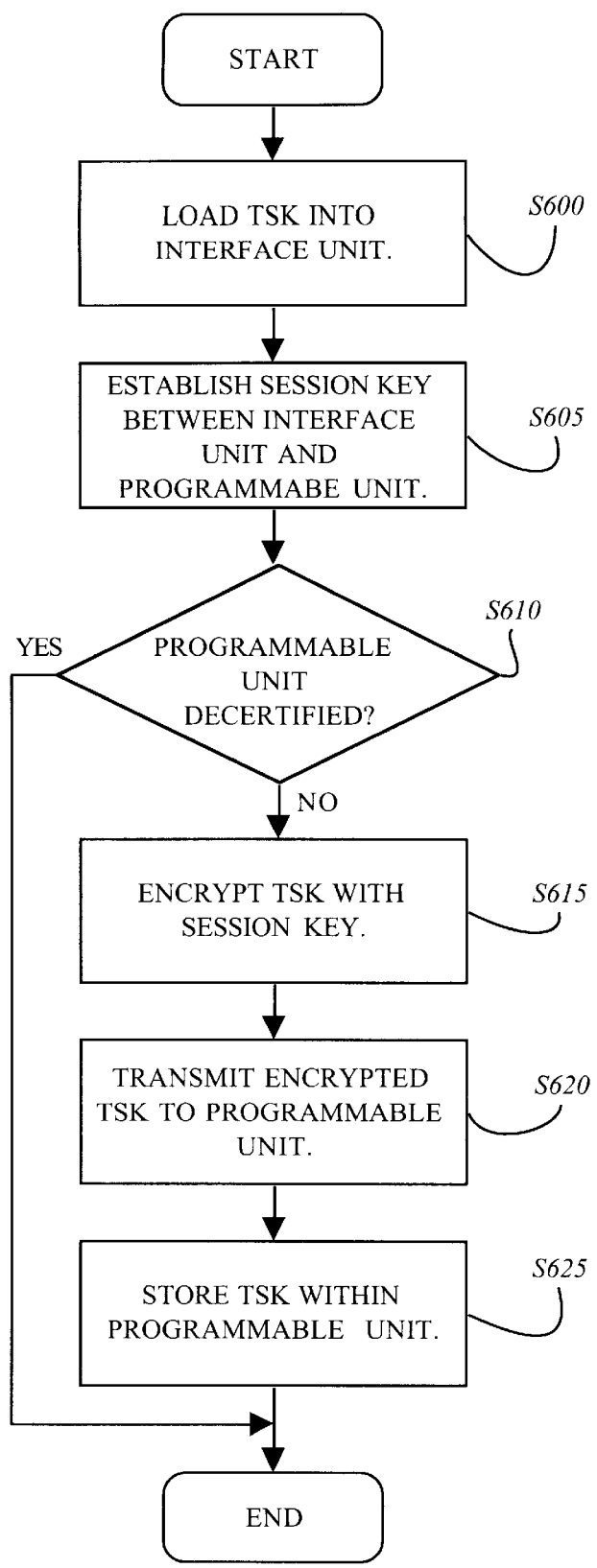
FIG. 6A is a diagram of a first embodiment of a key loading procedure for the time-sensitive key (TSK).

The TSK may be loaded into the interface unit and the programmable unit in accordance with a number of procedures. For example, as shown in FIG. 6A, TSK may be loaded directly into the interface unit outside the digital bit stream band (S600). TSK may be transferred to the programmable unit in a secure manner after establishing a session key (SESS) between the interface unit and the programmable unit (S605). SESS may be established using a well-known zero-knowledge authentication procedure described in FIG. 7C.

However, before transmission of TSK but normally after a secure communication link between the programmable unit and the interface unit has been established, an optional operation is performed to determine if the programmable unit has been decertified. This determination is based on the revocation information contained in the incoming digital bit stream or a previously transmitted digital bit stream (S610). If the programmable unit has been decertified, TSK is prevented from being loaded into the programmable unit. Otherwise, TSK may be encrypted with SESS and transmitted to the programmable unit (S615 and S620).

TSK may be stored at programmable unit 120 in tamper resistant software as described above (S625). Likewise, TSK may be stored at interface unit 110 of FIG. 1 in an encrypted format or in a non-encrypted format. It is contemplated, however, that TSK may be initially loaded into programmable unit 120 and subsequently transferred to interface unit 110 after checking for revocation and, if desirable, establishing a secure communication link between units.

Figure 6B:
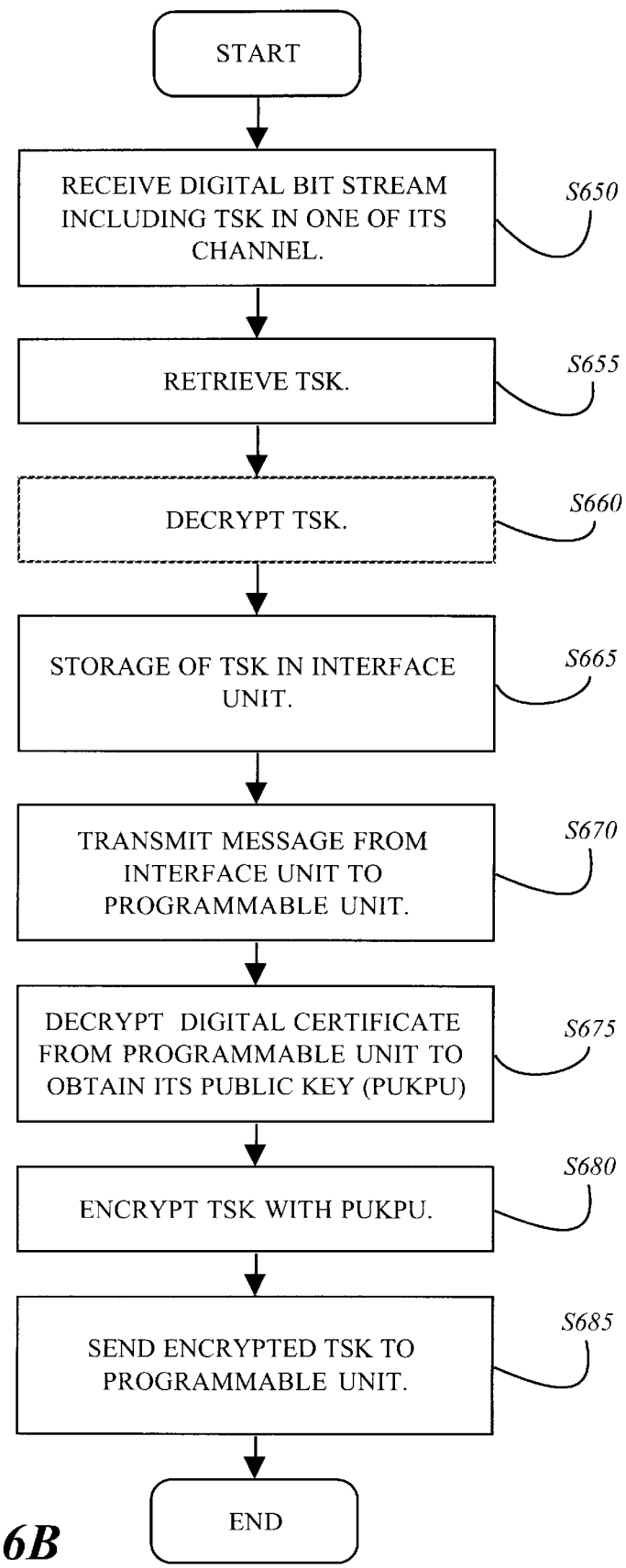
FIG. 6B is a second embodiment of a key loading procedure for the time-sensitive key (TSK).

Another procedure is to load the TSK through a digital transmission from a transmission source as shown in FIG. 6B. TSK is contained in a predetermined communication channel of the digital bit stream (S650). The interface unit retrieves TSK, and possibly decrypts before storage therein, such as within internal memory or within the removable peripheral, as described in FIG. 2 (S655, S660 and S665). Next, the interface unit may transmit a message to the programmable unit requesting the digital certificate associated with the programmable unit (S670). Upon receipt of the digital certificate, a public key of programmable unit (PUKPU) is obtained (S675). Thereafter, TSK may be encrypted with PUKPU and transmitted to the programmable unit for decryption and loading of TSK into its tamper resistant software (S680 and S685). Alternatively, although not shown, a session key may be negotiated and TSK encrypted with the session key before transmission to programmable unit 120.

Embodiments of Pre-Transfer Operations

Figure 7A:
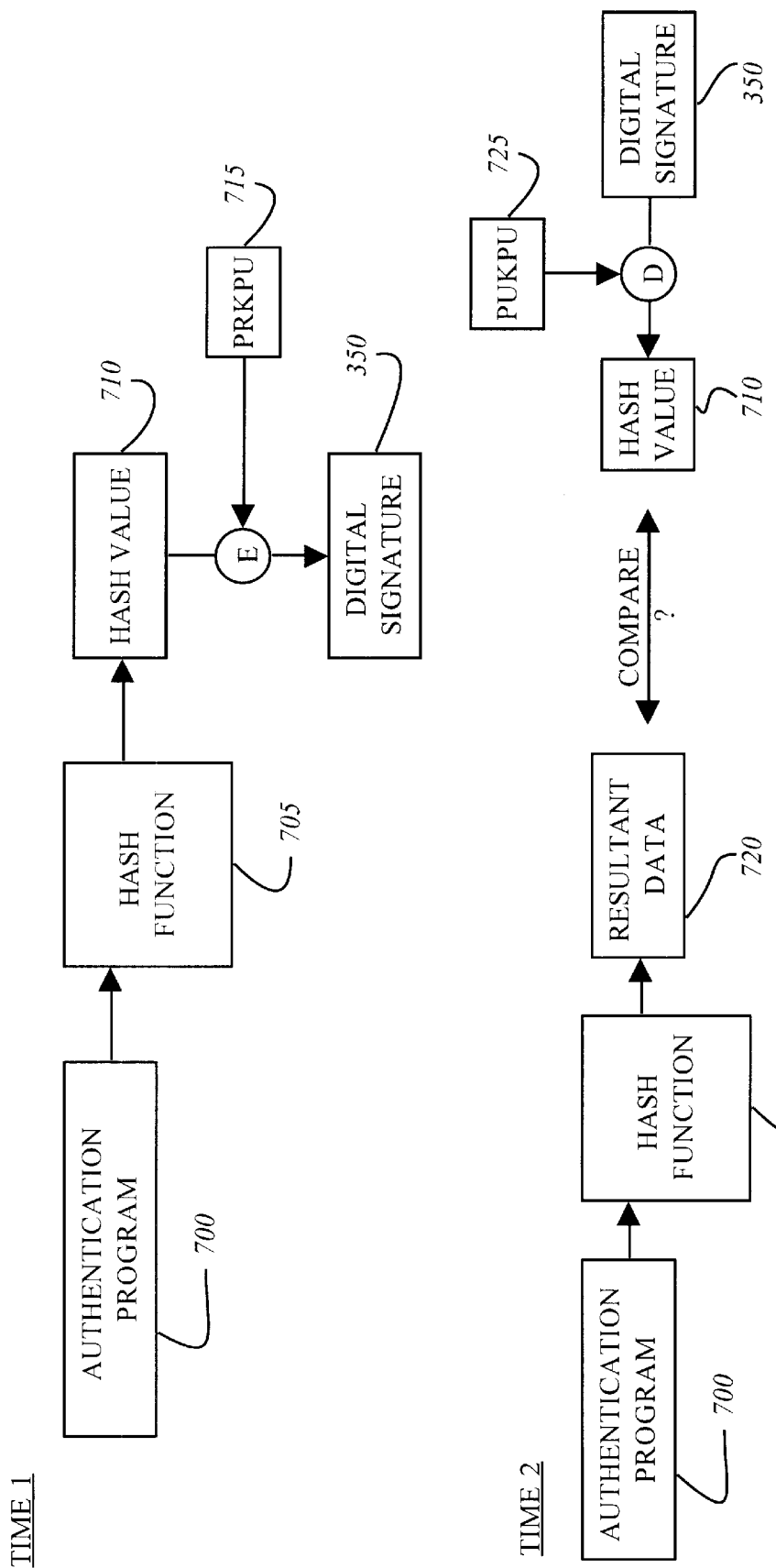
FIG. 7A is a diagram of an illustrative embodiment of a technique of applying counter measures by the programmable unit to detect illicit software modifications.

When the TSK is contained in the interface unit and programmable nit but prior to digital content is transferred therebetween, a number of conditions are satisfied. A first condition is for the programmable unit to apply counter measures to detect well-known software tricks typically used to gain access to the TSK. For example, as shown in FIG. 7A, one counter measure may involve ensuring that the integrity of information critical to the secure operations of the programmable unit (e.g., authentication program) has not been compromised. This may be performed by using one or more digital signatures.

For example, during manufacture (time 1) of the programmable unit, the authentication program 700 may be input into a one-way hash function 705 to produce a hash value 710. This hash value 710 would be digitally signed by a private key (PRKPU) 715 associated with the programmable unit to produce digital signature 350 also shown in FIG. 3. Prior to periodically executing the authentication program 700 (e.g., during power-up), at run-time (time 2), the one-way hash function 705 is used by the programmable unit to produce resultant data 720. The resultant data 720 is subsequently compared with the hash value 710 associated with digital signature 350 obtained for decrypting digital signature 350 with the public key (PUKPU) 725. If there is a match, this indicates authentication program 700 has not been tampered. If there is a discrepancy, this indicated authentication program 700 has been tampered. This causes the interface unit to prevent digital content from being transmitted into the programmable unit.

Figure 7B:
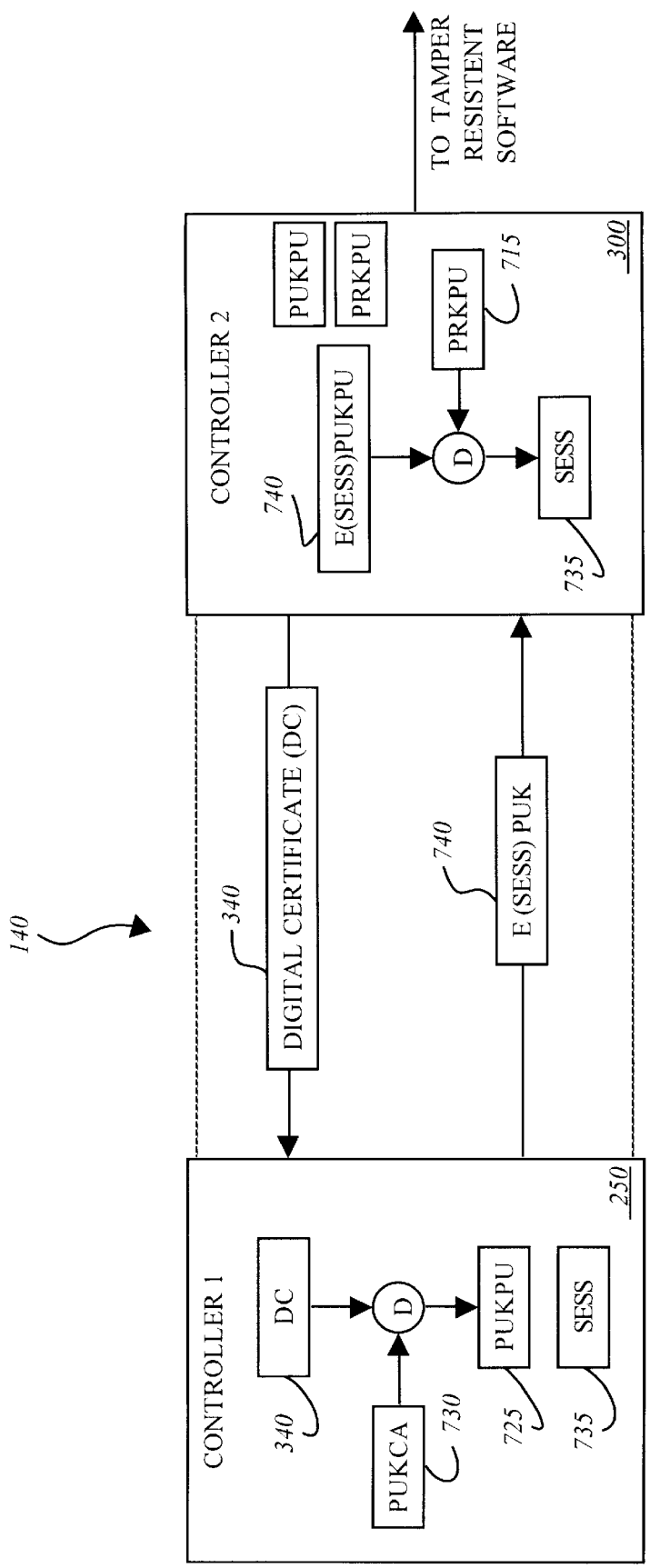
FIG. 7B is a diagram of an illustrative embodiment of a technique of protecting the integrity of a communication link between the interface unit and the programmable unit.

With respect to protecting integrity of communication link 140, as shown in FIG. 7B, a session key (SESS) can be negotiated between control circuitry of both the interface unit (e.g., first controller 250 of FIG. 2) and programmable unit (e.g., second controller 300 of FIG. 3). Such negotiation may involve the programmable unit transmitting the pre-loaded digital certificate 340 of FIG. 3 to the interface unit. The digital certificate 340 may include a public key associated with the second controller (PUKPU) 725 of the programmable unit. The digital certificate 340 is decrypted by the interface unit using a well-known public key (PUKCA) 730 associated with a certification authority (e.g., OEM public key). Once PUKPU 725 is obtained, the interface unit may generate a session key (SESS) 735 and encrypt SESS 735 with PUKPU to produce an encrypted session key "E(SESS)PUKPU" 740 before transmission to the programmable unit. The programmable unit is able to retrieve SESS by decrypting E(SESS)PUKPU 740 using its private key (PRKPU) 715. This session key may be stored in tamper resistant software to hinder being compromised.

Figure 7C:
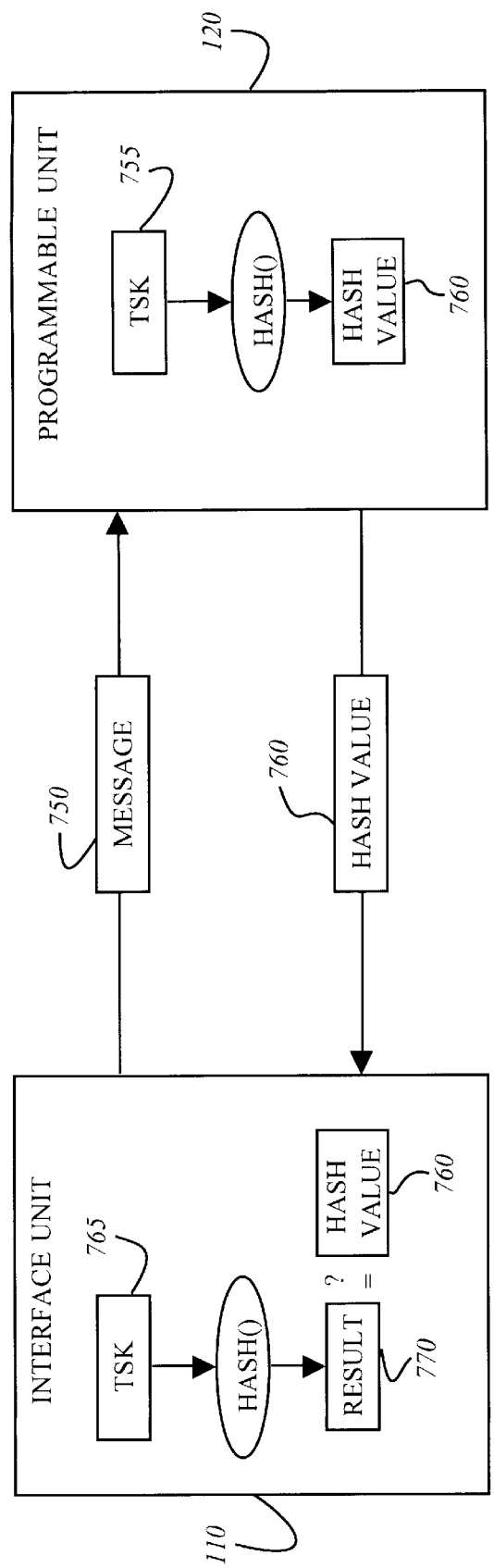
FIG. 7C is a diagram of an illustrative embodiment of an authentication scheme is based on an established zero-knowledge protocol to authenticate the programmable unit.

There are a wide array of schemes that can be used to authenticate programmable unit 120. One well-known authentication scheme is based on an established zero-knowledge protocol as generally shown in FIG. 7C. In this embodiment, interface unit 110 transmits a message 750 to the programmable unit requesting a hash value of the TSK loaded within tamper-resistant software. In response, programmable unit 120 performs a one-way hash function on TSK 755 to produce the hash value 760 and returns hash value 760 to interface unit 110. Then, interface unit 110 would perform a one-way hash function on its TSK 765 to produce a result 770 and compare hash value 760 with result 770. If these values compare, programmable unit 120 is capable of receiving the digital content because both units possess identical TSKs. If these values differ, the digital content is prevented from being loaded into programmable unit 120.

Second Embodiment of the Electronic System

Figure 8A:
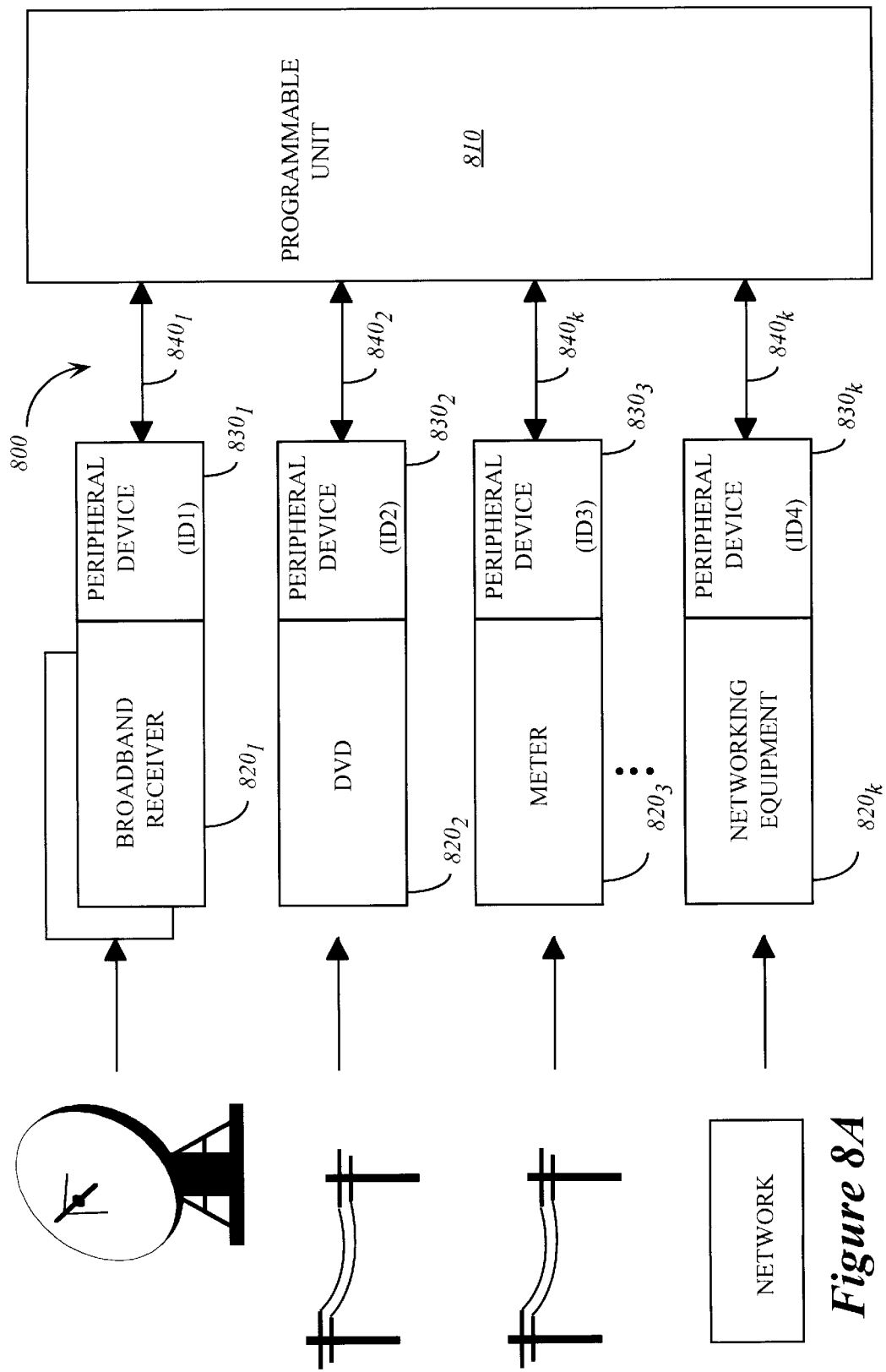
FIG. 8A is an illustrative block diagram of a second embodiment of the electronic system utilizing the present invention to receive information from an external source.
Figure 8B:
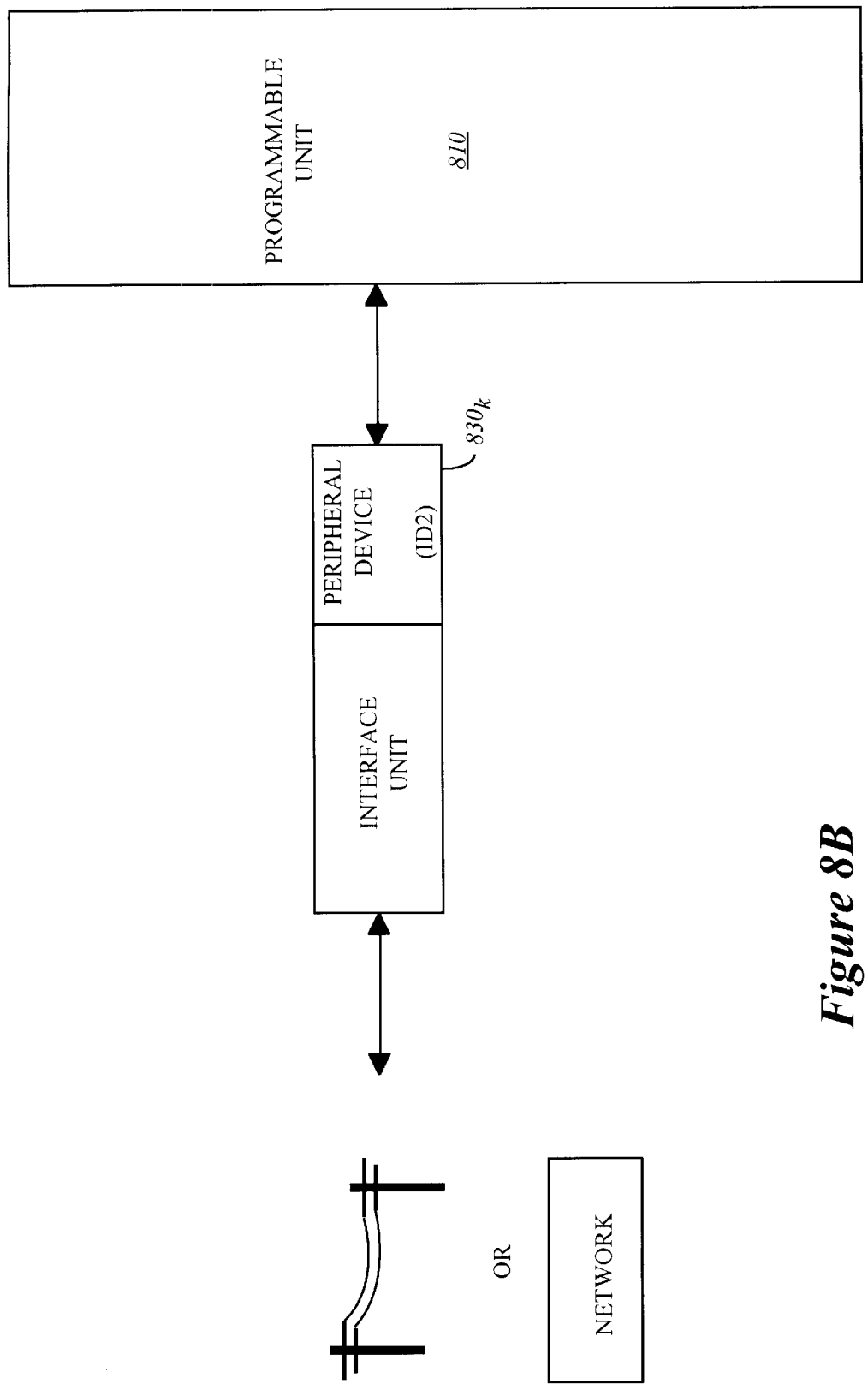
FIG. 8B is an illustrative block diagram of the second embodiment of the electronic system utilizing the present invention to transfer information to an external source.

Referring to FIGS. 8A and 8B, illustrative embodiments of an electronic system 800 is shown. As shown in FIG. 8A, electronic system 800 includes an programmable unit 810 and a plurality of interface units 820₁–820$_k$ ("k" is a positive whole number). This electronic system 800 differs from electronic system 100 of FIG. 1. A distinction is that programmable unit 810 is capable of supporting communications from multiple interface unit 820$_1$–820$_k$. Examples of these interface units may include, but are not limited or restricted to (i) a broadband receiver 820$_1$, (ii) a DVD player 820$_2$ which receives digital content directly from the content provider, (iii) a meter 820$_3$ which calculates and stores the cost of digital content provided to programmable unit 810 and/or (iv) networking equipment 820$_k$ to establish a connection to a wide area network (WAN), a local area network (LAN) or any other type of network. An example of the networking equipment may include IP telephony equipment.

Another distinction is the inclusion of authentication specific hardware (ASH) devices 830$_1$–830$_k$ such as dongles. Each ASH device 830$_1$–830$_k$ is attached to a communication port of a corresponding interface unit 820$_1$–820$_k$ and is assigned a predetermined identification value. As a result, interface units 820$_1$–820$_k$ and their corresponding ASH devices 830$_1$–830$_k$ are able to regulate the flow of digital content into programmable unit 810 by preventing digital content from being downloaded if it is not associated with the selected identification value.

Digital content is provided to programmable unit 810 via a selected interface unit (e.g., interface unit 820$_1$) after various operations are successfully performed. First, programmable unit 810 internally checks whether various programs therein have been modified without authorization through hash value comparisons. Second, a secure communication link 840$_1$ between the selected interface unit 820$_1$ and programmable unit 810 is established. Third, programmable unit 810 is authenticated to ensure that an attempt is not being made to fraudulently access the digital content. These operations may be performed as described above.

With respect to FIG. 8B, electronic system 800 supports bi-directional communications. In particular, programmable unit 810 of electronic system 800 is able to transmit information to a distributed communication link (e.g., phone lines, network, etc.) in response to an event. The event, for example, may include a condition where programmable unit 810 is precluded from receiving a TSK to decrypt downloaded content such as a failure to authorize payment for a requisite key to decrypt a pay-per-view video feed.

Third Embodiment of the Electronic System

Figure 9:
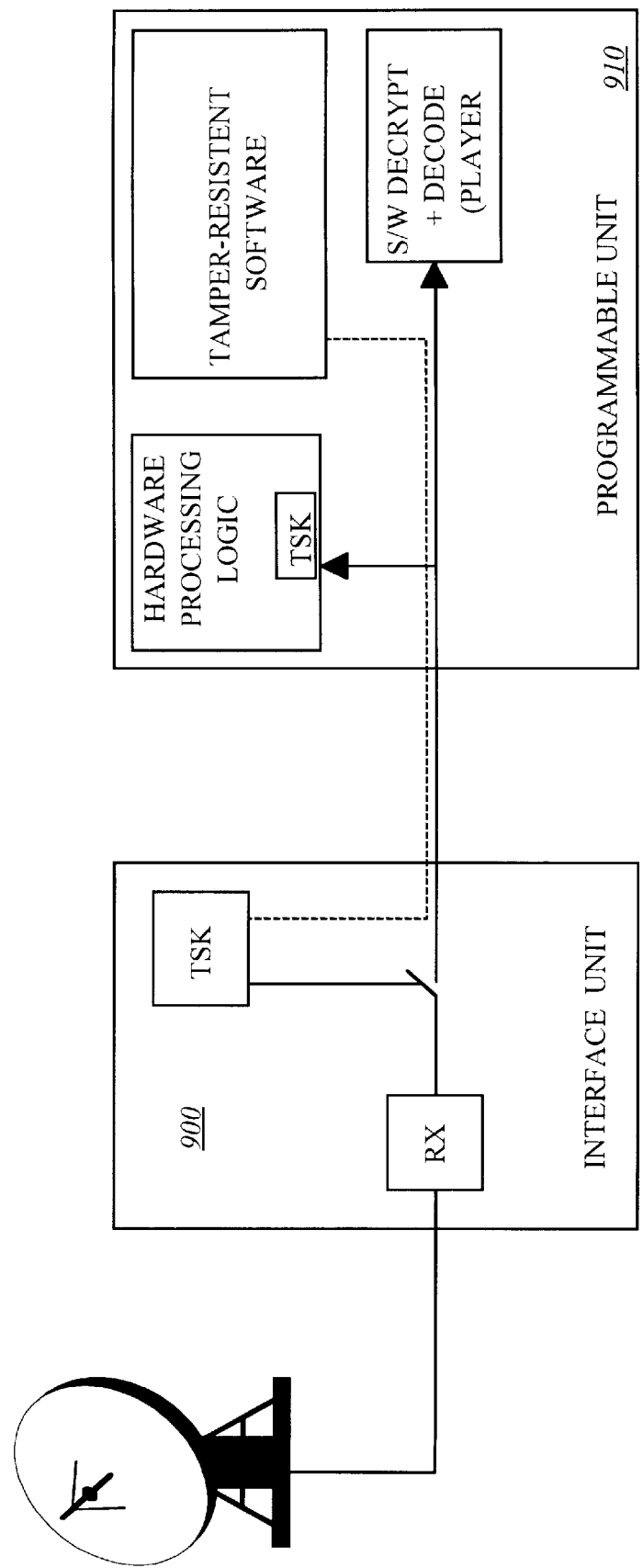
FIG. 9 is an illustrative block diagram of a third embodiment of the electronic system utilizing the present invention.

Referring to FIG. 9, a third illustrative embodiment of the electronic system 900 is shown. In this embodiment, electronic system 900 includes an interface unit 910 and a programmable unit 920. Interface unit 910 may be configured as a receiver with modem or wireless capability as shown of FIG. 2. However, instead of connecting an authentication specific hardware (ASH) device to interface unit 910, programmable unit 920 is altered to include a hardware processing logic 930 as described below.

The hardware processing logic 930 includes at least a processor and non-volatile memory contained in a single integrated circuit package or a multi-chip package. Upon downloading TSK into programmable unit 920, TSK is loaded into non-volatile memory contained in hardware processing logic 930. Thus, before transmitting digital content from interface unit 910 to programmable unit 920, programmable unit 920 may be authenticated as described in FIG. 7C in which security-related executable programs are tamper-resistant but authentication being performed internally within hardware processing logic 930.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A system comprising:
   an interface unit to contain a time-sensitive key being a series of instructions distributed in space and able to be executed sequentially in time; and
   a programmable unit coupled to the interface unit, the programmable unit to receive digital content from the interface unit upon establishing that the time-sensitive key is also contained within the programmable unit.

2. The system of claim 1, wherein the time sensitive key comprises a plurality of bits forming a signal value in a binary format distributed in space and in time.

3. A system comprising:
   an interface unit to contain a time sensitive key, the time-sensitive key is partitioned into a plurality of subparts, each subpart assigned to a subprogram of an authentication program able to be executed over time; and
   a programmable unit coupled to the interface unit, the programmable unit to receive digital content from the interface unit upon establishing that the time-sensitive key is also contained within the programmable unit.

4. A system comprising:
   an interface unit to contain a time-sensitive key; and
   a programmable unit coupled to the interface unit, the programmable unit to receive digital content from the interface unit upon establishing that the time-sensitive key is also contained within the programmable unit, the digital content received by the programmable unit further includes a revocation list indicative of whether the programmable unit is authorized to receive the digital content.

5. The system of claim 4, wherein the interface unit comprises one of a broadband receiver, a digital versatile disk player and a meter.

6. The system of claim 4, wherein the programmable unit comprises one of a computer, a set-top box and a digital television.

7. The system of claim 6, wherein the programmable unit includes a memory containing an executable program stored in a tamper-resistant format.

8. The system of claim 3, wherein the programmable unit includes a memory bank containing a program partitioned into a plurality of subroutines, each subpart of a plurality of subparts of the time-sensitive key corresponding to one of the plurality of subroutines.

9. The system of claim 8, wherein the programmable unit further includes at least one memory bank to contain a digital certificate and a digital signature.

10. A method for hindering unauthorized access to digital content, the method comprising:
    periodically transmitting a time sensitive key between an interface unit and a programmable unit; and
    performing pre-transfer operations to ensure that the programmable unit is authorized to receive the digital content, the pre-transfer operations include verifying that a communication link between the interface unit and the programmable unit is secure.

11. A method for hindering unauthorized access to digital content, the method comprising:
    periodically transmitting a time sensitive key between an interface unit and a programmable unit, the time sensitive key comprises a series of instructions periodically updated; and performing pre-transfer operations to ensure that the programmable unit is authorized to receive the digital content.

12. The method of claim 11, wherein the series of instructions provides revocation information to identify at least one programmable unit precluded from further using the time-sensitive key.

13. A method for hindering unauthorized access to digital content, the method comprising:

periodically transmitting a time sensitive key between an interface unit and a programmable unit; and performing pre-transfer operations to ensure that the programmable unit is authorized to receive the digital content, the performing of the pre-transfer operations includes checking whether an authentication program loaded in the programmable unit has been modified.

14. A method for hindering unauthorized access to digital content, the method comprising:

periodically transmitting a time sensitive key between an interface unit and a programmable unit; and performing pre-transfer operations to ensure that the programmable unit is authorized to receive the digital content, the performing of the pre-transfer operations includes authenticating the programming unit.

* * * * *

UNITED STATES PATENT AND TRADEMARK OFFICE
CERTIFICATE OF CORRECTION

PATENT NO. : 6,069,647  Page 1 of 1
DATED : May 30, 2000
INVENTOR(S) : Sullivan et al It is certified that error appears in the above-identified patent and that said Letters Patent is hereby corrected as shown below:

Column 3,
Line 22, delete "signa;", insert -- signal --.

Column 3,
Line 44, delete "i.e., as such", insert -- , such as --.

Column 7,
Line 62, delete "nit", insert -- unit --.

Signed and Sealed this

Twenty-sixth Day of November, 2002

Attest:

JAMES E. ROGAN
Attesting Officer    Director of the United States Patent and Trademark Office